Dec. 26, 1933.  H. R. ALLEN  1,941,133
LUBRICATING DEVICE
Filed April 20, 1932  2 Sheets-Sheet 1
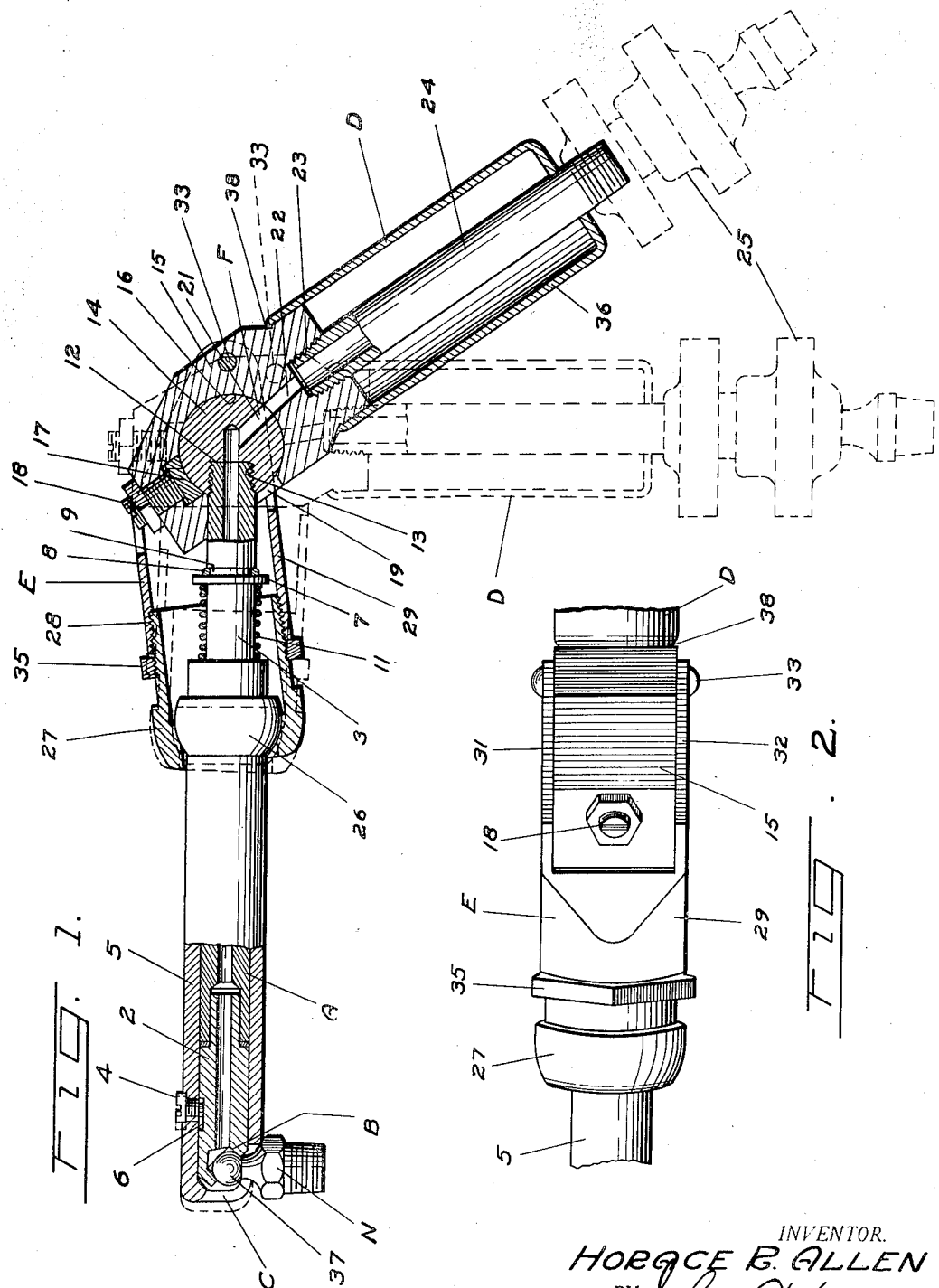
INVENTOR.
HORACE R. ALLEN
BY John A. Watson
ATTORNEY.

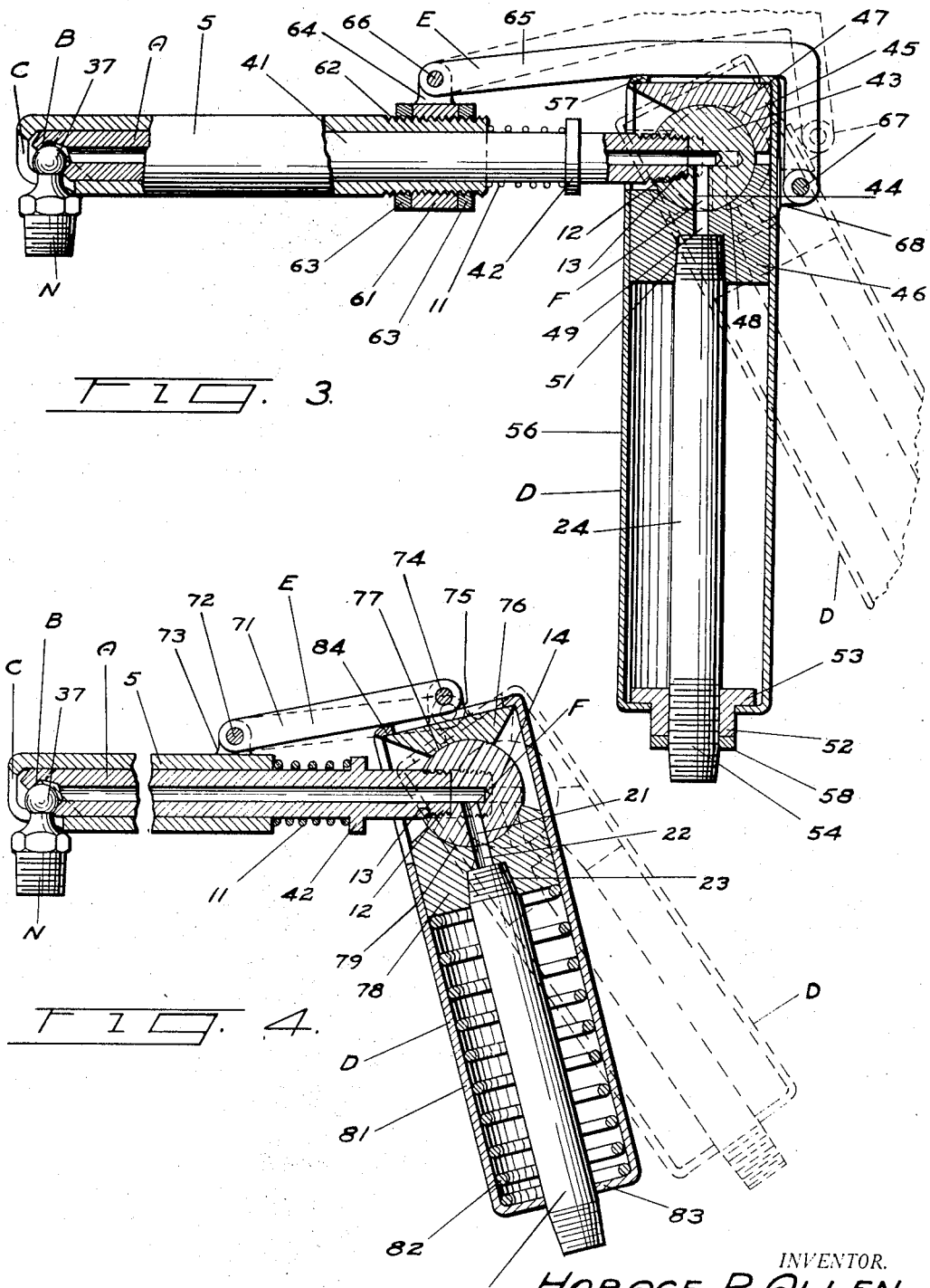

Patented Dec. 26, 1933

1,941,133

UNITED STATES PATENT OFFICE 1,941,133

LUBRICATING DEVICE

Horace R. Allen, South Bend, Ind., assignor to The Lubrication Corporation, South Bend, Ind., a corporation of Delaware Application April 20, 1932. Serial No. 606,334

8 Claims. (Cl. 284—17)

This invention relates to improvements in lubricant discharge nozzles and more particularly nozzles of the type incorporating means for clamping the nozzle upon a lubricant receiving nipple or fitting during the lubricant servicing operation.

An object of the invention is to provide a lubricant discharge nozzle wherein the clamping mechanism may be operated by the actuation of the hand grip, by which the nozzle is supported, about a pivotal mounting therefor.

Another object is to provide a discharge nozzle of the clamp type incorporating a simple valve for automatically shutting off the flow of lubricant through the nozzle as the clamping mechanism is moved to release position.

A further object is to provide a lubricant discharge nozzle wherein a relatively high clamping force is obtainable with minimum manual effort, and wherein the clamping and unclamping of the nozzle to and from the fitting may be accomplished with ease and through natural movement of the operating hand as in directing the nozzle upon the nipple or fitting.

Other objects, the advantages and uses of the invention, will be or should become apparent after reading the following description and claims and after consideration of the accompanying drawings forming a part of this specification, in which:

Fig. 1 is a sectional view of a lubricant discharge nozzle constructed in accordance with my invention;

Fig. 2 is a fragmentary top plan view of nozzle illustrated in Fig. 1;

Fig. 3 is a sectional view of another form of the discharge nozzle; and

Fig. 4 is a sectional view of a further form of the discharge nozzle a part thereof broken away.

In general each of the lubricant discharge nozzles selected for illustration comprises, a conduit A having a lubricant discharge orifice B at one end, a sleeve, having an integral clamping member C, slidably disposed relative to and about the conduit A, a hand grip D pivotally supported upon the conduit, and mechanism E associated with the hand grip D and the sleeve bearing the clamping member C for causing relative movement between the conduit and the clamping member upon angular movement of the hand grip about its pivotal mounting. The nozzles further include valve structure F forming a part of the lubricant conducting system through the hand grip D and the pivotal mounting therefor.

In Figs. 1 and 2 I have illustrated one form of my improved lubricant discharge nozzle in which the conduit A is formed of two aligned tubular members 2 and 3. The member 2 is relatively short and includes the discharge orifice B. A stud screw 4 extending through the side wall of the sleeve 5, of which the clamping member is an integral part, is partially received within a longitudinal groove or slot 6 on the outer side wall of the member 2 to prevent the rotation of the parts relative to one another. The member 3 has a washer 7 surrounding the outer and rearward side wall thereof beyond the end of the sleeve 5 fixed against rearward movement along the conduit by a split ring 8 disposed in an annular groove 9 in the conduit wall. A compression spring 11 surrounds the conduit and is arranged to bear at one end against the end of the sleeve 5 and at the other end upon the washer 7 thus tending to cause relative movement between the sleeve 5 and the conduit A to move the clamping member C and the discharge orifice B away from one another.

The rearward end of the conduit member 3 is externally threaded at 12 and engaged with an internally threaded bore 13 formed in a cylindrical member 14, the axis of which is perpendicular to the axis of the conduit. A body member 15 forming a part of the hand grip assembly D is pivotally mounted upon the cylindrical member 14 through the medium of an enlarged bore 16 therethrough within which the cylindrical member 14 is closely fitted. The body 15 includes a friction block or shoe 17 which bears against the side walls of the member 14 under the pressure of an adjustment screw 18 to insure frictional engagement between conduit and hand grip and to press the adjacent side walls of the member 14 and body 15 about the ports of the valve F together to preclude leakage of lubricant through the valve structure. An opening 19 through the forward wall of the body 15 serves to permit pivotal movement of the body upon the cylindrical member 14 by providing clearance for the adjacent end of the conduit member 3.

The valve F, formed in part of the pivotal hand grip mounting as described, comprises a passage 21 communicating with the bore of the conduit member 3 and extending through the member 14 radially from the center of the member toward the rearward and lower outer wall thereof as viewed in Fig. 1 and a passage 22 through the body 15 one end of which may register with the passage 21 when the hand grip D is in the position shown in full lines of Fig. 1, and the other end of which is internally threaded, as shown at 23. The externally threaded end of a tube 24 is secured in the threaded mouth 23 of the passage 22 and the opposite end of the tube is adapted for connection by threaded engagement with a source of lubricant supply as through a swivel coupler 25 such as shown in dotted lines in Fig. 1.

The mechanism E for causing relative movement between the conduit A and the sleeve 5 comprises a collar 26 having outer side walls defining a zone of a sphere, which is securely fastened about the sleeve 5 as by force fit through shrinkage. An elongated socket member 27 surrounds the collar 26 and is internally fashioned to conform in contour to the outer surface of the collar 26 so as to have limited universal movement thereupon. The rearward end of the socket member 27 is externally threaded at 28 for screw engagement with a cage 29 encompassing the side walls of the body member 15. The cage 29 is pivotally connected at opposite sides 31 and 32 to the body 15 through the medium of a pin 33 extending through the body 15 and the side walls of the cage at a point rearward of the axis of the cylindrical member 14 and to the right and beneath the axis of the bore 16 in the body 15. A threaded locking ring 35 is provided to lock the cage 29 and socket 27 against movement relative to each other.

In order that the hand grip D may present a more convenient shape for manual engagement as during support of the gun and actuation of the mechanism E a cylindrical shell 36 is disposed about the tube 24 and fixed at its upper end 38 to an annular groove formed in the body 15 by spinning or rolling the member into the groove.

This form of nozzle is intended for use with lubricant dispensing apparatus including a flexible hose or conduit connected to the nozzle as by threaded engagement with the swivel coupler member 25. In servicing a lubricant fitting, as the fitting N, the nozzle is held and supported in the hand of the operator by manual engagement with the cylindrical member 36 of the hand grip D and the nozzle, particularly the conduit A, directed toward the head 37 of the fitting. The conduit A and sleeve 5 of the nozzle upon registration over the head 37 of the fitting N may then be moved laterally (downwardly as viewed in Fig. 1) so that the head 37 may pass between the clamping member C and the discharge orifice B along an axis transverse to the axis of the conduit A and assume the position shown in the drawing. At this time the hand grip D will be substantially in the position shown in dotted lines in Fig. 1 and the clamping member C and discharge orifice B spaced away from one another at or near their limits of relative travel. The operator may next draw rearwardly upon the hand grip D to cause that member to assume the position shown in full lines in Fig. 1 thereupon causing rotative movement of the body 15 about the cylindrical member 14 to cause the cage 29 forming a part of the mechanism E to be drawn rearwardly by virtue of the shifting of the pivotal connection 33 so that the clamping member C and discharge orifice B will move relatively toward one another to clamp the head 37 of the nipple N in engagement tightly with the discharge orifice B of the conduit. When the parts are in the position shown in full lines, as shown in Fig. 1, the valve structure F will lie in that position wherein communication between the tube 24 and the bore of the conduit A is established through alignment of the valve ports 21 and 22. With reference to the dotted line position of the parts in Fig. 1 it will be noted that the valve ports 21 and 22 are out of registration, hence lubricant may not pass through the nozzle from the source of supply when the nozzle is in its unclamped position as when disengaged from the fitting. The spring 11 functions constantly to urge the conduit A and the clamping member C yieldingly to the dotted line position as shown in Fig. 1 so that when the nozzle is disengaged from the fitting the parts remain normally in that position in readiness for initial engagement with the fitting at all such times as when the hand grip D is in its dotted line position.

Should wear occur between the cylindrical member 14 and the bore 16 in the body 15 or should the parts turn too freely relative to one another for convenience the friction shoe 17 may be caused to bear with greater or less pressure upon the cylindrical surface of the member 14 by the manipulation of the screw 18. The limits of travel of the clamping member C and of the conduit A during predetermined movement of the hand grip D may be predetermined by adjustment of the socket member 27 and the cage 29 by virtue of the screw threaded joint 28 and when adjusted the members may be held against further movement by tightening the lock nut 35.

While I have illustrated and described my improved discharge nozzle as adaptable for connection with a lubricant source of supply through a flexible hose or conduit it should be understood that, if desired, a lubricant cartridge or similar lubricant container may be directly connected and supported to and upon the tubular member 24 provided some self contained or manual pressure means is associated with the cartridge or container to force lubricant through the nozzle into the fitting. Such cartridge and lubricant container structure is well known and established in the art.

In Fig. 3 I have illustrated another form of the discharge nozzle wherein the clamping function of the member C and conduit A to clamp the head 37 of the fitting N in engagement with the discharge orifice B is brought about through manual thrust upon the hand grip D in a direction toward the fitting.

The conduit A is formed of a single tubular member 41 having the discharge orifice B formed at its outer end and externally threaded at its rearward end, as shown at 12. An integral flange 42, having a function similar to the ring 7 of the nozzle first described, is formed adjacent to the rearward end of the conduit to serve as an abutment for one end of the compression spring 11 the opposite end of which bears against the adjacent end of the sleeve 5 of which the clamping member C is an integral part. A cylindrical member 43 having an internally threaded bore 13 is secured to the rearward end of the conduit A by threaded engagement between the portion 12 of the conduit and the internally threaded bore 13. The member 43 is similar to the cylindrical member 14 in structure and function except that the port 44 of the valve structure F is disposed along an axis substantially 90° from the axis of the conduit A. A pair of metal blocks 45 and 46 having opposed cylindrical walls 47 and 48 respectively provide a broken cylindrical chamber within which the member 43 is disposed. The block 46 has a valve port or passage 49 extending along the axis of the hand grip D and terminating at an internally threaded portion 51 within which one end of the tube 24 is secured by threaded engagement. An internally threaded bushing 52 having a laterally extending flange 53 is mounted upon the externally threaded and lower end 54 of the tube 24. A substantially cylindrical metal shell 56 surrounds the blocks 45 and 46 and the bushing 52 beneath the flange 53. The upper end 57 of the shell 56 is spun inwardly to form an abutment for the upper face of the block 45 and to hold the block assembly within the shell. The blocks 45 and 46 are caused to closely engage with the cylindrical walls of the cylinder member 43 by turning upon the exposed and depending portion of the bushing 52 by a wrench or similar tool to cause relative movement between the conduit and the bushing. A lock nut 58 may be used to hold the bushing in its adjusted position.

The mechanism E comprises an internally threaded collar 61 which is disposed upon the externally threaded and rearward end 62 of the sleeve 5. Lock nuts 63 may be used to hold the collar and sleeve against relative movement when adjusted. An upstanding lug 64 is provided on the collar 61. A substantially L shaped link 65 is pivotally connected at 66 to the lugs 64 of the collar 61 and at 67 to a lug 68 secured to the outer side wall of the sleeve 56 as by welding or other similar fastening process. When the parts are in the full line position of Fig. 3 the link 65 follows the adjacent contour of the rearward side wall of the sleeve 56 and the upper surface thereof. This position represents a maximum limit of travel of the sleeve 5 and conduit A relative to one another in one direction i. e. that direction during which clamping of the nozzle upon the head of the fitting N is accomplished. When the hand grip D is moved to the dotted line position of Fig. 3 the link 65 will become elevated and relative movement between the conduit A and sleeve 5 will take place, an amount sufficient to permit complete disengagement between the nozzle and the fitting head. When in full line position the valve structure F is in that position necessary to establish communication between the tube 24 and the conduit A and when in the dotted line position the ports 44 and 49 of the valve are out of alignment and therefore in that position to preclude the flow of lubricant through the nozzle.

The discharge nozzle of Fig. 3, in one respect, functions reversely to that shown and described in connection with Figs. 1 and 2 in that continued forward thrust of the hand grip D from the dotted line position to the full line position after approach and initial engagement between the head 37 of the fitting and discharge orifice B causes relative movement between the conduit and the clamping member C to clamp the discharge orifice tightly upon the head of the fitting. It will be noted therefore, that the manual movement necessary to clamp the nozzle upon the fitting is but a continuation of the natural movement of the hand of the operator in directing the nozzle toward and in initial engagement with the fitting and that therefore the application of the nozzle to the fitting up to the time during which lubricant is to be conducted therethrough comprises a series of simple natural movements requiring little or no previous instruction.

In Fig. 4 I have illustrated a further form of the discharge nozzle which is similar in many respects to the nozzle illustrated in Fig. 3 and like reference numerals have been employed to designate like parts. The nozzle differs from that shown in Fig. 3 in that there is no provision for adjustment in connection with the operating mechanism E since the link 71 of the mechanism is pivotally connected at 72 to a fixed lug 73 which may be formed integral with the sleeve 5 and the opposite end of the link 71 is pivotally connected at 74 to a fixed lug 75 which may be formed as an integral part of a block 76 similar to the block 45. The block 76 is provided with a cylindrical surface 77 adapted to engage with and form a bearing for the cylindrical wall of the member 14 while a second block 78 having a cylindrical surface 79 engages with the opposite side of the member 14 to provide a bearing therefor. The bearing block 78 has an internally threaded portion 23 communicating with the valve passage or port 22 which is connected by threaded engagement with the tube 24 through which lubricant may be conducted to the conduit if the valve ports 21 and 22 are in registration.

A metal shell 81 serves to confine the blocks 76 and 78 and surrounds the depending portion of the tube 24 and to house a compression spring 82 disposed about the tube 24 one end of which is arranged to bear against the adjacent face of the block 78 and the other end against an inwardly turned portion 83 of the shell. The upper end of the shell is rolled inwardly, as shown at 84, to serve as an abutment for the block 76. It will be apparent therefore that the spring 82 functions to maintain tight engagement between the blocks 76 and 78 and the cylindrical member 14.

The operation of the nozzle illustrated in Fig. 4 is somewhat different from the operation of the nozzles of Figs. 1 and 3. Construction of the nozzles of Figs. 1 and 3 is such that when the handles are moved to clamping positions with the fitting head disposed between the clamping jaws, the nozzles are locked in clamping engagement with the fittings. The nozzle of Fig. 4 does not lock on the fitting but is secured thereagainst only so long as the handle member is urged to the left i. e. the full line position in Fig. 4. The nozzles of Figs. 1 and 3 operate in the manner mentioned by reason of the displacement of the lever arm pivots across the center line of force applied to effect the clamping action. This action may be observed in Fig. 1 wherein it will be noted that the center of the pivot 33 moves from the dotted line position to the full line position in going from the unclamped to the clamped position. In Fig. 3 the pivot 67 corresponding to the pivot 33 moves downwardly from the dotted line position to the full line position past a line passing through the center of the pivot 43 and the center of clamping upon the ball fitting. In Fig. 4 however, there is no overthrow of the pivot 74 past the center line of force application.

While I have illustrated and described one preferred and several modified forms of the invention and have illustrated the several forms disclosed in connection with ball headed fittings of the general type illustrated in Morris Patent No. 1,749,830, it should be understood that the invention is susceptible of embodiments and other forms bearing little physical resemblance to the forms illustrated and that the nozzles and their operating mechanisms may be modified so that they may be used for clamping engagement with lubricant nipples or fittings of other types such for instance as that commonly known as the pin type fitting. Consequently I do not desire to be limited except by the spirit of the invention and the scope of the appended claims.

I claim:

1. A lubricant discharge nozzle comprising, a lubricant conduit having a discharge member at one end, a clamping member associated with said conduit for clamping said discharge member against a lubricant receiving fitting, means forming a hand grip pivotally mounted upon the opposite end of said conduit, means associated with said clamping member and said hand grip means for operating said clamping member upon pivotal movement of said hand grip relative to said conduit and a valve formed in the pivotal mounting of said hand grip operable for controlling the flow of lubricant through said nozzle upon actuation of said hand grip about its pivotal connection with said conduit.

2. A lubricant discharge nozzle comprising, a lubricant conduit having a discharge member at one end, a clamping member associated with said conduit for clamping said discharge member against a lubricant receving fitting, means forming a hand grip pivotally mounted upon the opposite end of said conduit, said hand grip means including a lubricant conducting conduit one end of which is adapted for connection with a source of lubricant supply, means associated with said clamping member and said hand grip for operating said clamping member upon pivotal movement of said hand grip means relative to said conduit and a valve formed in the portions of said conduit and said hand grip comprising the pivotal mounting of the hand grip for establishing communication between said conduits when the hand grip is in one position and for occluding communication therebetween when the hand grip is in another position.

3. A lubricant discharge nozzle comprising, a lubricant conduit having a discharge member at one end, a clamping member associated with said conduit for clamping said discharge member against a lubricant receiving fitting, a member forming a hand grip pivotally mounted upon the opposite end of said conduit and comprising a continuation of said conduit, means associated with said clamping member and said hand grip member for operating said clamping member upon pivotal movement of said hand grip member relative to said conduit and resilient means tending to move said clamping member yieldingly to unclamped position.

4. A lubricant discharge nozzle comprising, a conduit having a discharge member at one end thereof adapted for engagement with a lubricant receiving fitting, a cylindrical member mounted upon the opposite end of said conduit with its axis transverse to the axis of the conduit, said member having a lubricant passage formed therein communicating with the bore of said conduit at one end and with the outer cylindrical wall thereof at the other end, and a hand grip member formed with a recess the walls of which are complementary to the outer wall of said cylindrical member, said cylindrical member being received within said recess to form a pivotal connection between the conduit and the hand grip member, said hand grip member having a passage therethrough one end of which is adapted for connection with a source of lubricant supply and the other end of which is located within said recess whereby said hand grip member may be moved relative to said conduit to establish or occlude communication between said conduit and said source of supply.

5. A lubricant discharge nozzle comprising a conduit having a discharge member at one end thereof adapted for engagement with a lubricant receiving fitting, a cylindrical member mounted upon the opposite end of said conduit with its axis transverse to the axis of the conduit, said member having a lubricant passage formed therein communicating with the bore of said conduit at one end and with the outer cylindrical wall thereof at the other end, a hand grip member formed with a recess the walls of which are complementary to the outer wall of said cylindrical member, said cylindrical member being received within said recess to form a pivotal connection between the conduit and the hand grip member, said hand grip having a passage therethrough one end of which is adapted for connection with a source of lubricant supply and the other end of which is located within said recess whereby said hand grip member may be moved relative to said conduit to establish or occlude communication between said conduit and said source of supply, and means for establishing predetermined pressure between the contacting areas of the pivotal joint between said cylindrical member and said hand grip member.

6. A lubricant discharge nozzle comprising, a conduit having a discharge member at one end thereof adapted for engagement with a lubricant receiving fitting, a cylindrical member mounted upon the opposite end of said conduit with its axis transverse to the axis of the conduit, said member having a lubricant passage formed therein communicating with the bore of said conduit at one end and with the outer cylindrical wall thereof at the other end, a hand grip member formed with a recess the walls of which are complementary to the outer wall of said cylindrical member, said cylindrical member being received within said recess to form a pivotal connection between the conduit and the hand grip member, said hand grip having a passage therethrough one end of which is adapted for connection with a source of lubricant supply and the other end of which communicates with said recess whereby said hand grip member may be moved relative to said conduit to establish or occlude communication between said conduit and said source of supply, a clamping member associated with said conduit for engaging with said lubricant receiving fitting when in registration with said member, and mechanism associated with said clamp member and said hand grip member for actuating the clamp member upon pivotal movement of said hand grip in one direction.

7. A lubricant discharge nozzle comprising, a lubricant conduit having a discharge member at one end adapted to engage with a lubricant receiving fitting, a clamp member adapted to engage with said fitting and mounted for operative movement along the axis of said conduit, a collar having a substantially spherical outer wall fixed to said clamp member, a cage adapted to engage with the outer wall of said collar to form a universal connection therewith and means including a member pivotally connected to said conduit and to said cage for causing relative movement between said conduit and said clamp member upon manual actuation of said pivoted member.

8. A lubricant discharge nozzle comprising, a conduit having a discharge orifice at its outer end, a clamping member movable along the axis of said conduit for clamping the conduit upon a lubricant receiving fitting, a manually operable hand grip pivotally mounted on said conduit, a valve for admitting lubricant to said conduit operable upon movement of said hand grip to a predetermined position relative to the conduit, and force multiplying means for imparting right line movement to said clamping member upon pivotal movement of said hand grip, the force multiplying ratio of said clamp operating means increasing as the hand grip approaches said predetermined position.

HORACE R. ALLEN.